June 11, 1940.  B. A. LITTLE  2,203,688
TUBE TESTING DEVICE
Filed Nov. 23, 1935   3 Sheets-Sheet 2
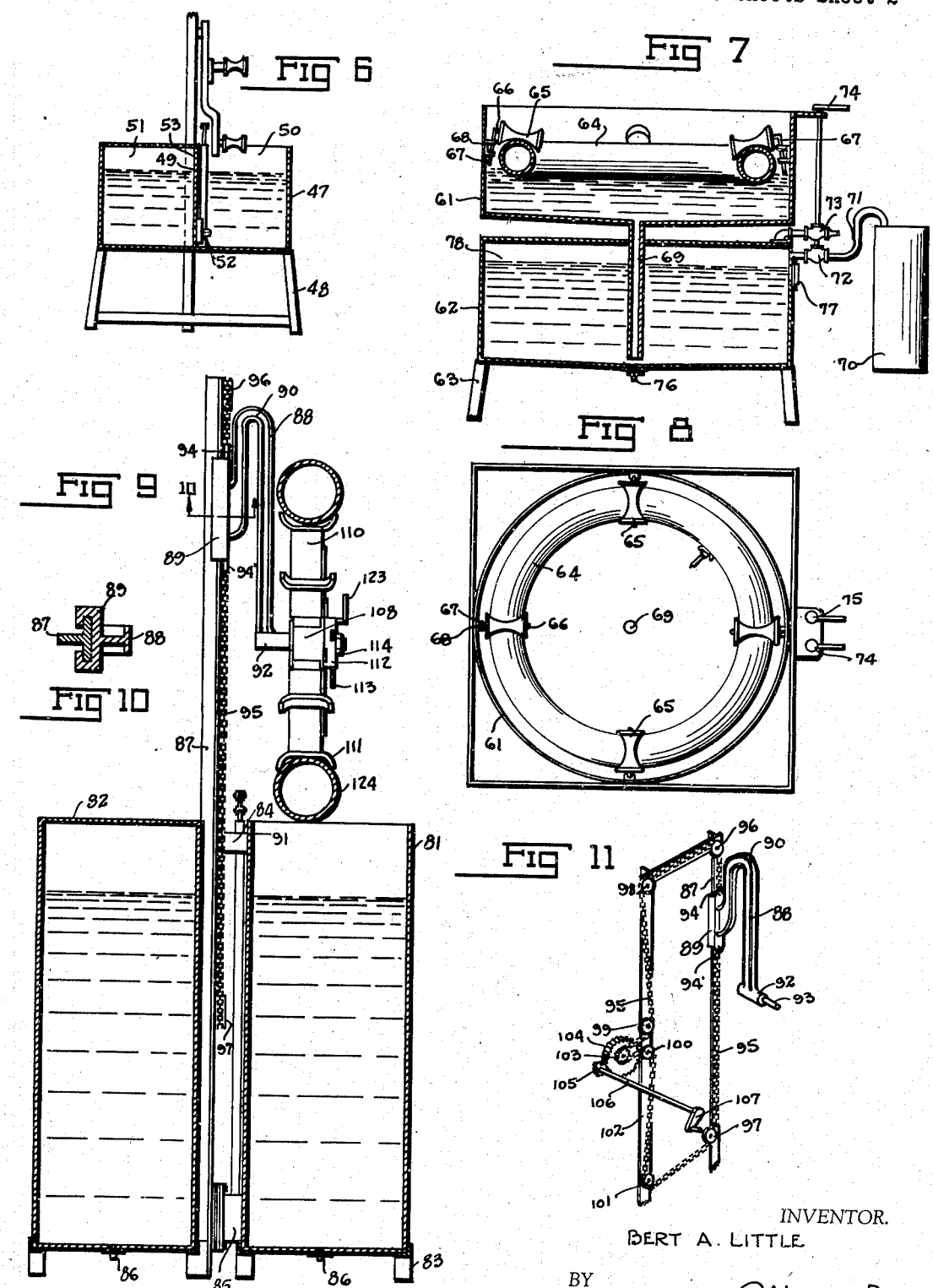
INVENTOR.
BERT A. LITTLE
BY Charles R Werner
ATTORNEY.

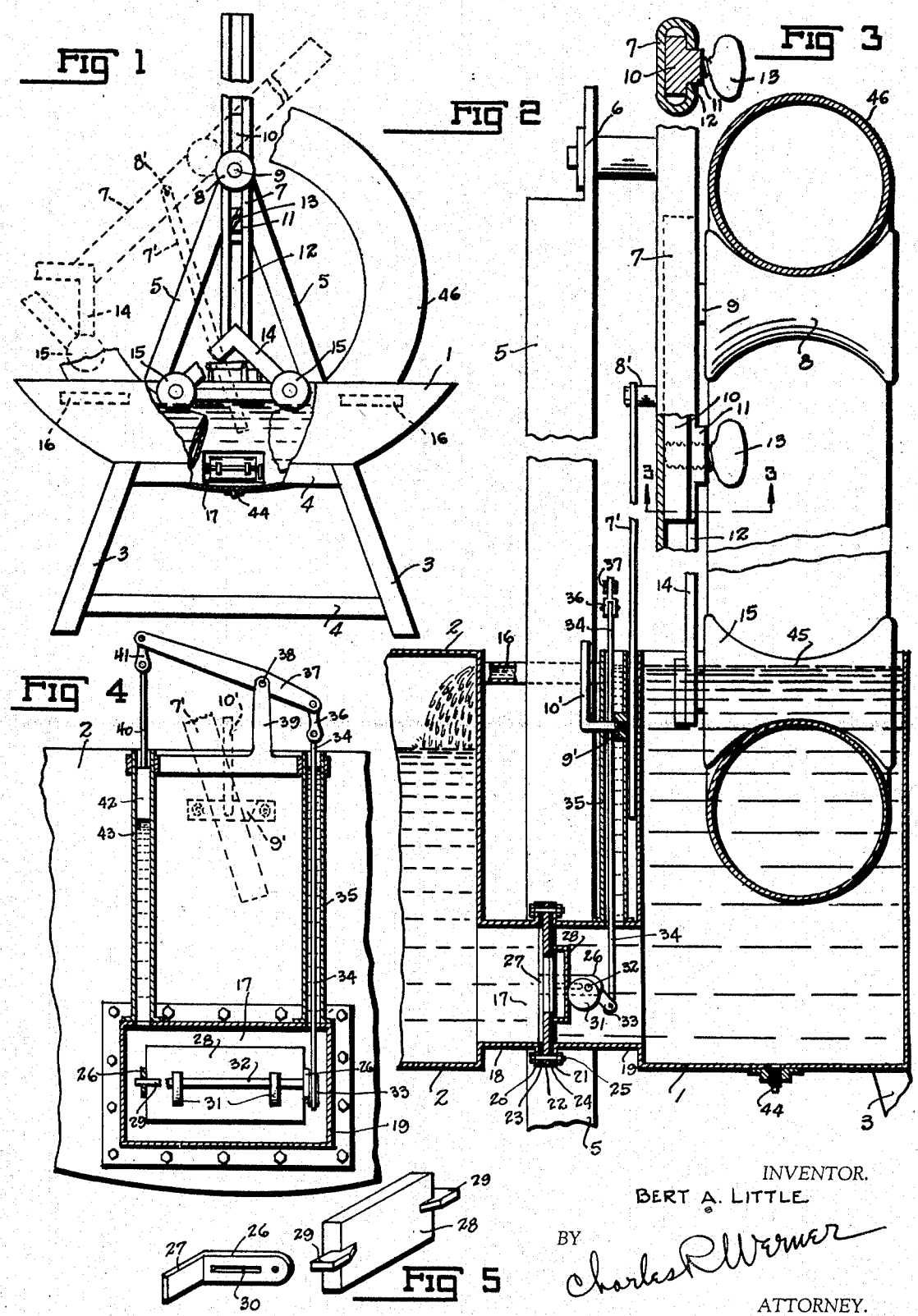

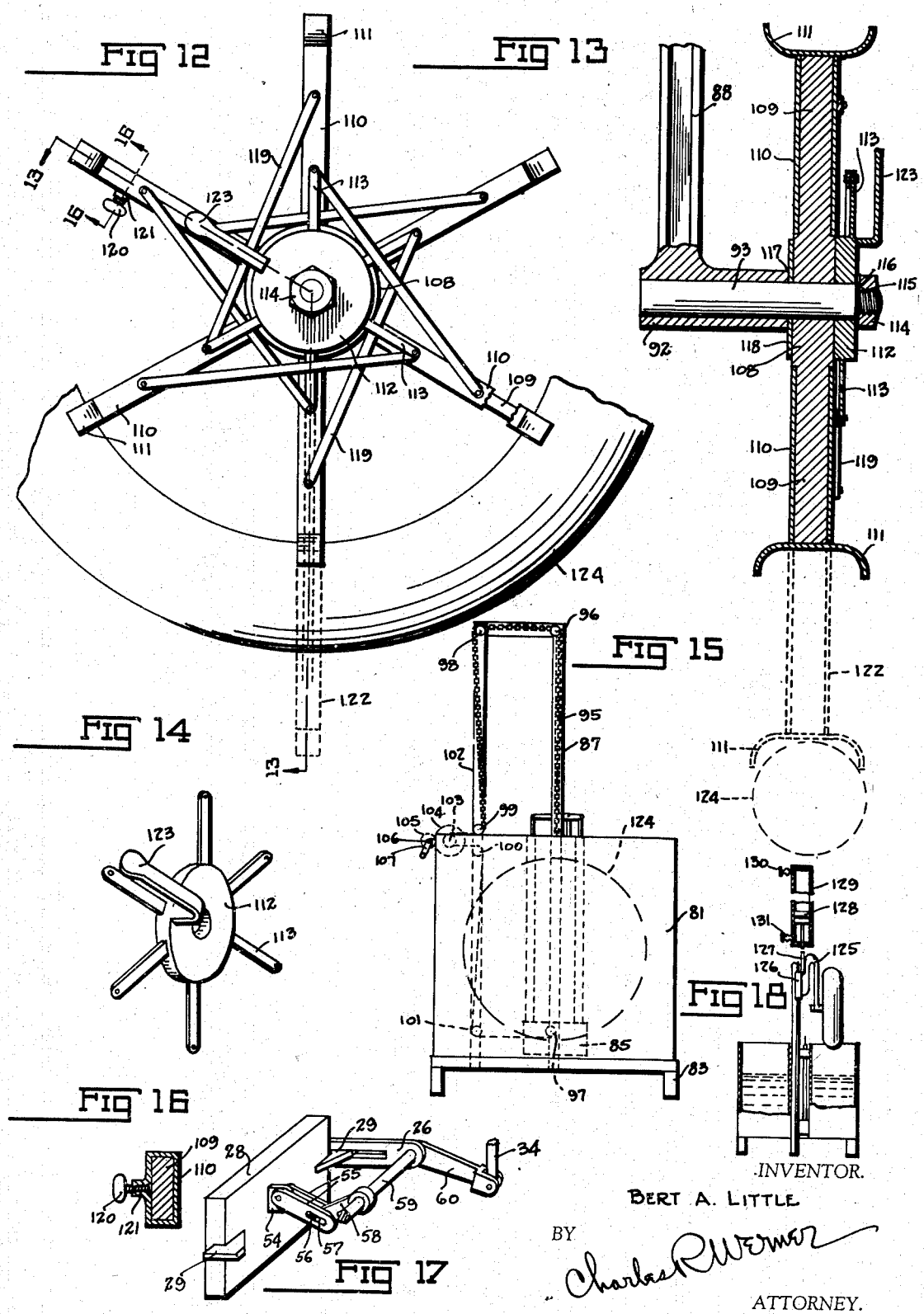

Patented June 11, 1940

2,203,688

UNITED STATES PATENT OFFICE 2,203,688

TUBE TESTING DEVICE

Bert A. Little, Wichita, Kans.

Application November 23, 1935, Serial No. 51,194

6 Claims. (Cl. 73—51)

My invention relates to tube testing devices and particularly to that class of device in which an inflated pneumatic inner tube is partially or totally immersed in liquid to test the tube for punctures or other defects causing leakage of air.

The objects of the invention are: first, to provide a tube testing device in which the inflated tube is held in immersed position by other means than the operator's hands, leaving them free to rotate the tube to check for leakage.

Second, to provide several novel forms of tube hold-downs, adjustable to diameter of any tube, capable of being moved into and out of immersion and allowing for rotation of the tube during the testing operation.

Third, to provide mechanical means for raising and lowering the tube hold-down.

Fourth, to provide a tube testing device in which the immersion of an inner tube will cause the liquid displaced by the tube to flow into an auxiliary tank and removal of the tube will allow the liquid to return to the same level in both tanks.

Fifth, to provide a pair of tanks or a single tank with a central partition, a valve between the tanks opening in one direction and controlled by a float, so that upon immersion of any object in the immersion tank the valve will close, causing the displaced liquid in the immersion tank to flow into the auxiliary or storage tank and upon removal of the object from the immersion tank, the pressure of the liquid in the storage tank will open the valve allowing the liquid to flow back into the immersion tank and reach the same level in both tanks.

Sixth, to provide a novel form of valve controlled by a float adapted to function by the rise and fall of liquid in a tank.

Seventh, to provide a tube testing device comprising an immersion tank and an airtight auxiliary or storage tank, an air supply under pressure connected to the storage tank, inlet and exhaust valves on the storage tank, the opening of the inlet valve allowing air to enter the storage tank to force liquid into the immersion tank to the desired level and the opening of the exhaust valve causing the air to leave the storage tank allowing the liquid in the immersion tank to flow back into the storage tank.

Eighth, to provide a tube testing device comprising an immersion tank superimposed upon an airtight auxiliary or storage tank and a drain depending from the bottom of the immersion tank to close proximity with the bottom of the storage tank, said storage tank being connected to an air supply source under pressure, inlet and exhaust valves on the storage tank, the opening of the inlet valve admitting compressed air to cause the liquid in the storage tank to rise into the immersion tank until the desired depth of liquid is reached, the opening of the exhaust valve allowing the air to escape from the storage tank causing the liquid in the immersion tank to fall to any desired level or to pass entirely into the storage tank.

Lastly, to provide a device of the class described, which will advance the art of tube testing to the point where a tube can be quickly and efficiently tested with no inconvenience or delay to the operator, by apparatus which may be constructed inexpensively and in a commercial and expeditious manner.

As far as I am aware, in present practice the only devices in use for testing inner tubes are tanks of very simple form, which do not have any mechanical means for holding the tube immersed. No means have heretofore been provided for controlling the amount or flow of liquid in the tank to accommodate different size tubes, whereas in my device the tube cannot cause the liquid to overflow since all of the surplus liquid displaced by any size tube will flow into the storage tank.

The invention in its various forms as they now present themselves to me, together with the construction and operation, will be clearly understood by reference to the following description in connection with the accompanying drawings in which:

Fig. 1 is a side elevational view of one form of my invention, parts being broken away to better illustrate certain other parts.

Fig. 2 is an enlarged fragmentary cross sectional view, parts being shown in elevation, illustrating details of the tube hold-down, hold-down locking means, valve and valve control.

Fig. 3 is a sectional view on the line 3—3 of Fig. 2.

Fig. 4 is a fragmentary, sectional view of the valve and valve control.

Fig. 5 is a disassociated detail view of the valve and one of its mounting brackets.

Fig. 6 is a cross sectional view through a modified form of my invention, showing a single tank divided into two compartments by a central partition, and also showing valve chamber and hold-down.

Fig. 7 is a cross sectional view through a further modified form of my invention illustrating an immersion tank superimposed upon a storage tank, the rise and fall of the liquid being controlled by air pressure.

Fig. 8 is a top plan view of one form of the device shown in Fig. 7.

Fig. 9 is a cross sectional view through a double tank, total immersion unit, showing a modified form of tube hold-down and means for raising and lowering same.

Fig. 10 is a sectional view on the line 10—10 of Fig. 9.

Fig. 11 is a perspective, semi-diagrammatic view of the means for raising and lowering the hold-down shown in Fig. 9.

Fig. 12 is an enlarged, detail elevational view of one form of tube hold-down.

Fig. 13 is a sectional view on the line 13—13 of Fig. 12.

Fig. 14 is a perspective view of the sleeve actuating member or spider used in the tube holddown shown in Figs. 9, 12 and 13.

Fig. 15 is a side elevational view of the device shown in Figs. 9 to 14, showing the hold-down control, the valve and valve control and also the hold-down and tube in immersed position.

Fig. 16 is a sectional view on the line 16—16 of Fig. 12.

Fig. 17 is a detailed perspective view of a modified form of valve and valve control.

Fig. 18 is a reduced sectional view through a further modified form of my invention showing means for raising and lowering the tube holddown by compressed air.

Referring now to the drawings by numerals of reference, 1 and 2 designate segmental shaped tanks, 1 being termed an immersion tank and 2 an auxiliary or storage tank. The tanks may be supported by any suitable means, as for instance, standards 3 and rails 4. Support members 5 are positioned between the two tanks and are joined at their apex 6 to form a support for the tube hold-down carrier 7 which is suitably pivoted at 6. A roller or other suitable tube support 8 is rotatably mounted on shaft 9, secured to sliding member 10 positioned in hold-down carrier 7 and having a projection 11 guided by slot 12 in the carrier 7, a wing screw 13 being provided for securely locking the sliding member 10 in any desired position to accommodate the inside diameter of the tube to be tested. At the lower end of the hold-down carrier 7 is a triangular frame 14 on which may be disposed a pair of rollers 15 suitably povoted and providing roller means for keeping the tube in immersed position.

Means for retaining the hold-down carrier 7 in raised position for applying the tube to the holddown or in immersed position for testing are provided by arm 7' pivoted to carrier 7 at 8', said arm passing through guide 9' and adapted to be locked in any desired position by lever 10' in threaded engagement with the guide 9'. In Fig. 1 the carrier 7 and arm 7' are shown swung to front position preparatory to mounting the tube thereon.

One or more overflow conduits or spillways 16 are provided near the top of and between the tanks 1 and 2. At the lower end of the tanks is a valve chamber and conduit 17 formed by ducts 18 and 19 having flanges 20 and 21, between which are positioned valve seat 22, flange gasket 23 and flange and valve gasket 24, all of which are drawn up tightly by suitable bolts 25 passing therethrough. Valve brackets or supports 26 pass through the valve gasket 24 and valve seat 22, the angular extension 27 of bracket 26 being suitably fastened to the valve seat 22. The valve 28 has lugs or supports 29 which are positioned in slots 30 of brackets 26 and guided thereby. Cams 31 are mounted on shaft 32, journaled in end of brackets 26 and have lever arm 33 attached thereto. Pivotally connected to lever arm 33 and rising vertically therefrom is connecting rod 34 which passes through an enclosure or standpipe 35 which opens into valve chamber 17 and extends upward to the height of the immersion tank 1. A short link 36 couples connecting rod 34 to end of rocker arm 37, pivoted at 38 to suitable support 39, the other end of the rocker arm being linked to float rod 40 through link 41. Float 42 is positioned in float chamber or standpipe 43 which is shown opening into valve chamber 17 but which could open directly into the immersion tank at any point below the normal level of the liquid. I do not wish to be limited to the particular form of float chamber and float shown since any one of a variety of floats and chambers may be used without departing from the spirit of the invention. Suitable drain plugs 44 may be provided in the bottom of both tanks.

The operation of the device which has been hereinbefore described is as follows: Liquid 45, when poured into tank 2, will flow into tank 1 through valve chamber or conduit 17, to the valve 28 being in open position. Therefore, sufficient liquid is poured into the tanks so that upon immersion of the smallest size tube the liquid will be displaced to a height just below the overflow 16. In actual practice, however, tubes of all sizes must be tested so for the explanation of operation of my invention I prefer to use a medium size tube 46. The tube is inflated a desired amount and placed below the rollers 15, the holddown carrier 7 first being swung on its pivot until the rollers 15 are out of the liquid, the carrier 7 being held in fixed position by moving the lever 10' to lock against arm 7'. The roller 8 on sliding member 10 is now adjusted to fit against the inside circumference of the tube and locked in this position. Lever 10' may now be released and the carrier 7 with the tube is swung into immersed position and again locked in place. The liquid displaced by the immersion of the tube therein will rise in the immersion tank and in the standpipes 35 and 43, causing the float 42 to rise, closing valve 28 through the linkage shown and previously described. Further displacement of liquid will cause it to flow into the auxiliary or storage tank 2 through overflow or spillway 16. It will be seen that regardless how far the tube is immersed, the liquid will always be maintained at a predetermined level in the immersion tank. The tube can now be revolved through the liquid on the rollers 8 and 15 to test for defects and punctures. Upon removal of the tube from the liquid, the float 42 will drop with the liquid releasing the pressure of the cams 31 on the valve 28 which will be opened by the force of the greater quantity of liquid in the storage tank 2, the liquid flowing through valve chamber 17 until at the same level in both tanks. This action is repeated every time the tube is immersed or removed from the liquid.

My invention may be modified as shown in Fig. 6, in which is illustrated a single tank 47, on standards 48, a central partition 49 dividing the tank into two compartments 50 and 51, one compartment for tube immersion and the other for storage of liquid, the valve 52 being placed on the partition and operating in substantially the same manner as heretofore described. An opening 53 serves as the overflow.

In Fig. 17 I have illustrated a modified form of valve control in which positive mechanical action is applied in both the opening and closing of the valve. The valve 28 is provided with one or more angularly disposed lugs 54 to which a pair of links 55 are pivoted, said links being slotted at 56 to receive pin 57 of lever arm 58 fixed to shaft 59, journaled in brackets 26, shaft 59 also carrying a second lever arm 60 pivotally secured to connecting rod 34. Downward movement on connecting rod 34 will cause the valve 28 to be pressed tightly against valve gasket 24 and upward movement will open the valve allowing the liquid to flow back into the immersion tank.

In Figs. 7 and 8 is illustrated another form of tube testing device in which the immersion tank 61 is superimposed above the sealed auxiliary or storage tank 62, suitable supports or standards 63 being provided. The tube 64 is held immersed by a plurality of rollers 65 rotatably mounted on shafts 66 having a depending arm 67 passing through supports 68 at an angle so that upward pressure on the roller 65 will lock the arm 67 in place. A conduit or supply pipe 69 projects downward from the bottom of the immersion tank 61 to within a short distance of the bottom of the storage tank 62. Compressed air is brought into the storage tank from a suitable source 70 through conduit 71, valved at 72. An air outlet valve 73 is provided, the control levers 74 and 75 of both valves being extended upward to a more convenient operating position. A drain plug 76 may be provided as well as a liquid level gauge 77.

In operating the device shown in Figs. 7 and 8, a desired quantity of liquid 78 is supplied to the storage tank 62 by introducing the liquid into tank 61, said liquid gravitating through conduit 69 into tank 62. The inflated tube 64 may be placed in the empty immersion tank at this time or after liquid is supplied to said immersion tank, at the discretion of the operator. With the outlet valve 73 closed, the air intake valve 72 is opened, admitting air under pressure, to cause the liquid 78 to rise through the pipe 69 into the immersion tank until the desired level is reached at which time the valve 72 is closed. The tube has now risen until in contact with the rollers 65 or if it has not been placed in the testing device it can now be placed under the rollers and forced below the surface by pressing down on the rollers until the desired degree of immersion is reached. The rollers will automatically retain their positions due to the peculiar mounting of the arms 67 in their supports 68. After immersion the tube may be revolved so that the leaks are brought to a position directly in front of the operator.

To remove the liquid from the immersion tank, the outlet valve 73 is opened, allowing the air to escape from within the storage tank so that the liquid in the immersion tank may gravitate to the storage tank. The level of the liquid in the immersion tank may be raised or lowered any desired amount in this manner. It is obvious that this principle of regulating the level of the liquid may be applied to the first form of my invention in which two tanks side by side are employed. The device may be constructed with a combination of tanks of any size or shape, the principle of operation being the same in all cases and therefore I do not want to be limited to the size, shape or combination of tanks shown.

Although not illustrated it is apparent that liquid may be conducted to the devices from the water supply in the building and a conduit may also be supplied to drain the liquid into the sewerage system, thereby making the tube testing device a permanent fixture connected to the plumbing of the building.

In Figs. 9 to 15 I have illustrated a modified form of tube hold-down and means for raising and lowering same out of and into the immersion tank. The essential difference in this modification is that the tube is entirely immersed vertically in the liquid while being tested so that the operator may look down directly on the tread of the tube upon which punctures and leaks are most liable to occur. Considerable pressure is required to entirely immerse an inflated inner tube and therefore a rigidly constructed mechanical means for forcing the tube into the liquid is required.

The immersion tank 81 and the auxiliary or storage tank 82 are mounted on suitable supports 83, the immersion tank being of a greater depth than the outside diameter of the largest size tube which is ordinarily tested in a tire service station. Overflow conduits or spillways 84 extend between the two tanks and a conduit and valve chamber 85 is also provided together with valve control means, their construction and operation being identically the same as hereinbefore specified. Drain plugs 86 may be provided at the bottom of tanks 81 and 82.

Rising vertically between the two tanks is a standard or tube hold-down bracket support 87, preferably of T-section as shown. The tube hold-down bracket 88 is integral with a sliding member 89 in sliding engagement with the T-section standard 87. The bracket 88 is of gooseneck shape as shown at 90 to clear wall 91 of tank 81. The lower end of the bracket 88 has a lateral extension 92 carrying stub shaft or axle 93 on which the tube hold-down rotates. The sliding member 89 has lugs or ears 94 and 94' to which are connected the ends of a sprocket chain 95 which passes around pulleys 96 and 97 mounted on T-shaped standard 87, and around pulleys 98, 99, 100 and 101 mounted on a suitable support or standard 102. The chain passes around a sprocket wheel 103 which is integral with a larger gear 104 in mesh with a small pinion 105 on shaft 106 suitably supported to the tank 81 and carrying crank lever 107. It will be seen that by rotating the lever 107 in either direction the tube mounted on the hold-down will be lowered or raised into or out of immersed position as desired.

The tube hold-down comprises a multi-spoked hub 108 rotatably mounted on shaft or axle 93. Each spoke 109 of hub 108 slidably carries a sleeve member 110 at the extreme end of which is a curved tube retainer 111. A sleeve actuating member or spider 112 having staggered fingers or levers 113 is rotatably mounted adjacent to the hub 108 on shaft or axle 93. Nut 114 threaded to reduced end 115 of axle 93 abuts shoulder 116 and retains hub 108 and spider 112 on the shaft, the length of the shaft 93 from the end 117 of the extension 92 to the shoulder 116 being greater than the total width of the hub 108, spider 112 and anti-friction washer 118, thereby allowing the hub, spider and washer to rotate freely on shaft 93. Connecting arms 119 are pivotally connected between each finger or lever 113 on the spider 112 and the sleeves 110 so that rotation of the spider in one direction will cause all the sleeves to slide outward on the spokes 109 to any desired position at which point they may be locked in place by tightening the set screw 120 threaded in boss 121 on one of the sleeves. The dotted lines 122, Figs. 12 and 13, indicate one of the sleeves in fully extended position.

A handle 123 is provided on the spider and in operating the hold-down the inflated tube 124 is rested on the uppermost finger or retainer 11, one of the sleeves or spokes is held by the operator and the spider 112 is rotated by means of the handle 123, sliding all the sleeves 110 outward simultaneously until all the tube retainers are bearing against the inner tube. The set screw 120 may then be tightened and the inner tube will be securely held by the hold-down which may be lowered into and rotated through the liquid as hereinbefore described. Upon immersion of the tube the valve in the valve chamber 85 will close causing the displaced liquid to pass through the conduit or overflow 84 into the storage tank 82. Removal of the tube will allow the valve control float to drop and the valve to open to permit the liquid in both tanks to adjust itself to the same level.

Fig. 18 illustrates a tube hold-down actuated by air pressure, the tank and hold-down being identical with that just described. The hold-down bracket 125 is fastened to a sliding member 126, connected by shaft 127 to a piston 128 positioned in cylinder 129 having valves 130 and 131, having vents therein which are open to the atmosphere when the valve is closed and shut off from the atmosphere when the valve is opened and air is being supplied to the cylinder 129, said valves being of standard construction. Compressed air is supplied to both valves in the cylinder from any suitable source. Opening the upper valve 130 will cause the piston to travel downward moving the inner tube into immersion and opening valve 131 in the lower end of the cylinder will cause the piston to move upward and raise the inner tube.

It is obvious that the several types of hold-downs illustrated and described herein may be used advantageously in single immersion tanks without auxiliary or storage tanks and while I have not specifically shown such an illustration, it is obviously included in the devices shown in the drawings accompanying this specification.

It is also apparent that while this specification and the drawings are drawn particularly to tube testing devices, the principles involved may be applied to immersion tanks and testing devices of various natures as for instance, dipping vats or tanks for coating, painting, staining, etc., of various articles, or in testing radiators, tanks and the like.

From the foregoing it will readily be seen that I have provided a tube testing device, relatively simple in construction and operation, adaptable to construction in various models and sizes and which will speed up and increase the efficiency of tube testing methods.

Various changes in form, proportion and details of construction may be resorted to without departing from the spirit of my invention and I reserve the right to all such equivalents of construction as come within the scope of this invention.

What I claim as new and desire to secure by Letters Patent is:

1. In a tube testing device, an immersion tank and a liquid storage tank, conduit means between the tanks, whereby the surplus liquid displaced by a tube immersed in the immersion tank will flow into the storage tank, and means for preventing the surplus liquid in the storage tank from returning to the immersion tank until the tube is removed from the liquid.

2. A tube testing device comprising an immersion tank and a liquid storage tank, a conduit between the tanks above the normal level of the liquid, a second conduit between the tanks below the normal level of the liquid, a valve in the second conduit, means for actuating the valve to close it when the liquid in the immersion tank rises and for allowing the valve to open when the liquid in the immersion tank falls.

3. In a tube testing device, a tank for holding a liquid, a central partition in the tank forming an immersion chamber and a storage chamber, conduit means between the tanks whereby the surplus liquid displaced by a tube immersed in the immersion chamber will flow into the storage chamber, and means for preventing the surplus liquid in the storage chamber from returning to the immersion chamber until the tube is removed from the liquid.

4. In a tube testing device, a tank for holding a liquid, a central partition in the tank forming an immersion chamber and a storage chamber, said partition having an opening therein above the normal level of the liquid and a second opening below the normal level of the liquid, a valve in the second opening, means for actuating the valve to close it when the liquid in the immersion tank rises and for allowing the valve to open when the liquid in the immersion tank falls.

5. A tube testing device comprising an immersion tank and a liquid storage tank, a conduit between the tanks above the normal level of the liquid, a second conduit between the tanks below the normal level of the liquid, a valve adapted to restrict the flow through the second conduit, and valve actuating means including a float operable by the rise and fall of liquid in the immersion tank.

6. A tube testing device comprising an immersion tank and a liquid storage tank, a conduit between the tanks above the normal level of the liquid, a second conduit between the tanks below the normal level of the liquid, a valve adapted to restrict the flow of liquid through the second conduit, cams adapted to close the valve, float means connected to the cams and adapted to urge said cams into valve closing position upon the rise of liquid in the immersion tank.

BERT A. LITTLE.